United States Patent [19]
Takemoto et al.

[11] Patent Number: 5,627,356
[45] Date of Patent: May 6, 1997

[54] CARD FOR RECORDING THE NUMBER OF GAME PLAY MEDIA, A CARD DISPENSING DEVICE, AND A CARD RECEIVING DEVICE

[75] Inventors: Takatoshi Takemoto; Kazunari Kawashima, both of Tokyo, Japan

[73] Assignee: Kabushiki Kaisha Ace Denken, Tokyo, Japan

[21] Appl. No.: 211,550

[22] PCT Filed: Oct. 8, 1992

[86] PCT No.: PCT/JP92/01307

§ 371 Date: Apr. 8, 1994

§ 102(e) Date: Apr. 8, 1994

[87] PCT Pub. No.: WO93/06903

PCT Pub. Date: Apr. 15, 1993

[30] Foreign Application Priority Data

Oct. 8, 1991 [JP] Japan ................... 3-260879
Oct. 21, 1991 [JP] Japan ................... 3-272659

[51] Int. Cl.$^6$ ........................................... G06F 7/08
[52] U.S. Cl. .................. 235/381; 235/375; 235/380; 902/23; 283/901
[58] Field of Search ......................... 235/381, 380, 235/494, 479, 487, 375; 902/23; 283/901

[56] References Cited

U.S. PATENT DOCUMENTS

| | | | |
|---|---|---|---|
| 4,349,611 | 9/1982 | Miyakawa | 428/500 |
| 4,373,726 | 2/1983 | Churchill et al. | 902/23 X |
| 4,575,622 | 3/1986 | Pellegrini | 235/382 |
| 4,626,672 | 12/1986 | Sapitowicz et al. | 902/23 X |
| 4,891,502 | 1/1990 | Motoi et al. | 235/379 |
| 5,085,934 | 2/1992 | Hotta et al. | 428/335 |
| 5,158,924 | 10/1992 | Konagaya et al. | 503/201 |
| 5,298,476 | 3/1994 | Hotta et al. | 503/201 |
| 5,321,239 | 6/1994 | Masubuchi et al. | 235/380 |

FOREIGN PATENT DOCUMENTS

| | | |
|---|---|---|
| 0000868 | 7/1978 | European Pat. Off. ....... G01K 11/16 |
| 0405054A1 | 1/1991 | European Pat. Off. . |
| 62-163192 | 7/1987 | Japan . |
| 63-792 | 1/1988 | Japan . |
| 63-211484 | 9/1988 | Japan . |
| 63-294880 | 12/1988 | Japan . |
| 64-46181 | 2/1989 | Japan . |
| 1-93887 | 4/1989 | Japan . |
| 250897 | 2/1990 | Japan . |
| 310393 | 1/1991 | Japan . |
| 3-121087 | 5/1991 | Japan . |
| 4126877 | 11/1992 | Japan . |
| WO87/06042 | 10/1987 | WIPO . |

OTHER PUBLICATIONS

Partial–English Translation of European Patent Document No. 0 405 054 (3 pages) (EP 405–054, Jan. 2, 1991, EP, Moses) see p. #8.

*Primary Examiner*—Donald T. Hajec
*Assistant Examiner*—Michael G. Lee
*Attorney, Agent, or Firm*—Lowe, Price, LeBlanc & Becker

[57] ABSTRACT

A card on which at least the number of game play media paid out to a player from a game machine is recorded and which is issued to the player. The card comprises a substrate and a recording portion, disposed on the substrate, for recording data. The recording portion is a layer made of a substance whose physical properties reversibly change by heating for visibly recording data by local heating according to a heating pattern corresponding to an image of data to be recorded.

18 Claims, 7 Drawing Sheets

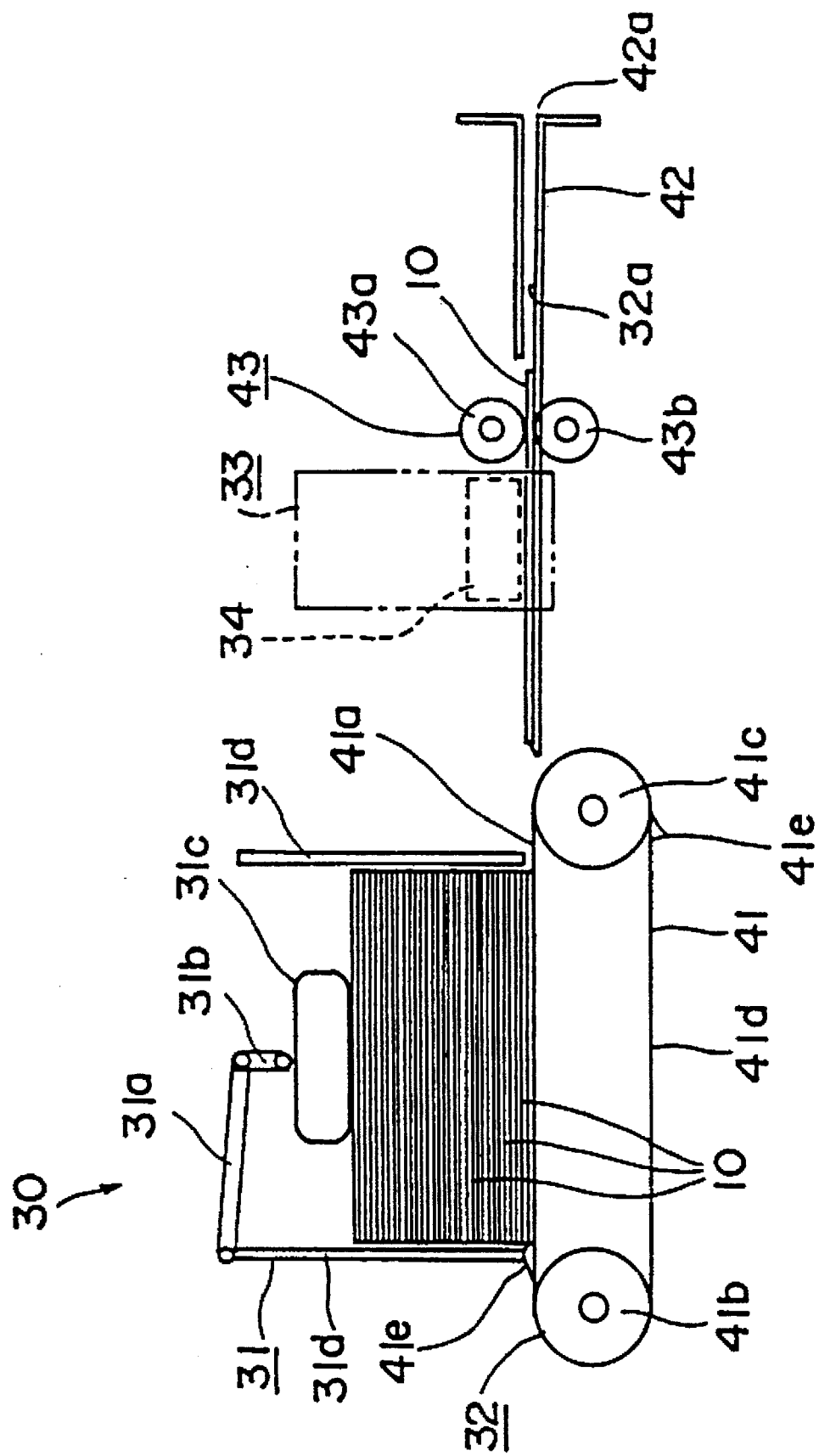

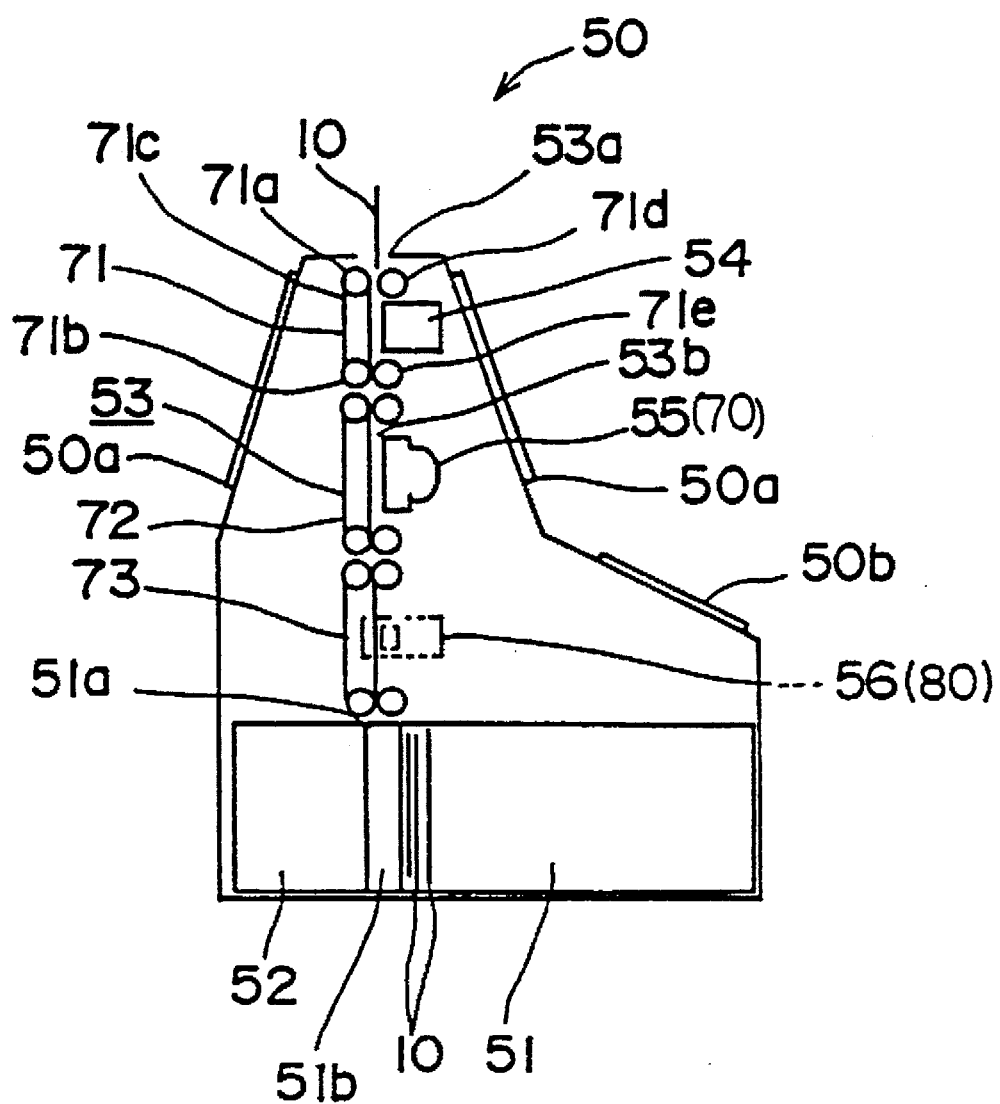

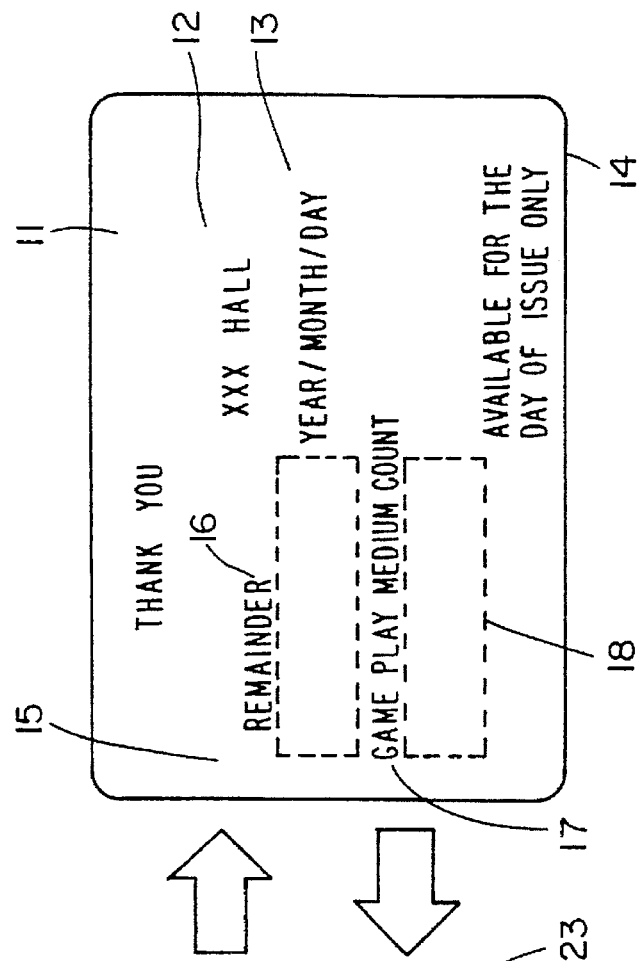
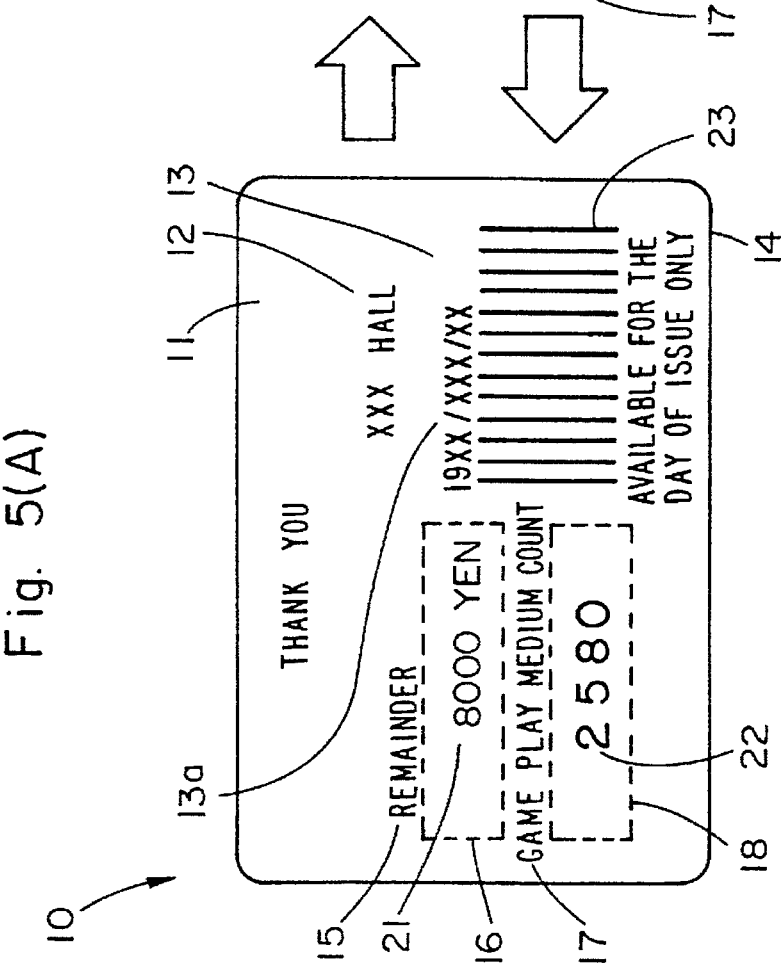

CARD FOR RECORDING THE NUMBER OF GAME PLAY MEDIA, A CARD DISPENSING DEVICE, AND A CARD RECEIVING DEVICE

TECHNICAL FIELD

This invention relates to a card for recording the number of game play media paid out to a player from a game machine when awarding plays, and a card dispensing device and a device for taking-in the card.

TECHNICAL BACKGROUND

In a game parlor having game machines such as slot machines, a player plays games through a game machine and acquires game play media such as metal balls and medals awarded for plays. The game play media acquired by the player are entered in a game play media counter in order to be counted and collected. The game play media counter counts the number of the entered game play media. When the player presses a pay switch, the game play media counter prints digits and a bar code indicating the number of game play media on thermosensible paper, which is used as media for recording the number of game play media, by a heat transfer print head thus issuing a receipt.

The player receives the receipt and takes it to a payment counter or office to exchange it for a prize corresponding to the number of game play media indicated on the receipt. It may be exchanged for cash or a coupon to play other games rather than the prize.

However, in the prior art, the receipt on which the number of game play media is recorded is generally paper, on which characters, etc., are printed, which are hard to erase and once used, they are discarded. Thus, the receipt expenses add up to a not inconsiderable amount of paper, and discarding the receipts is a waste of resources and produces a large amount of rubbish.

DISCLOSURE OF INVENTION

It is therefore a first object of the invention to provide a card for recording the number of game play media whereby media for recording the number of game play media can be used repeatedly, thus reducing receipt expenses as well as conserving resources and reducing the large amount of rubbish.

It is a second object of the invention to provide a card dispensing device and a card receiving device for handling the card for recording the number of game play media.

To the first end, according to the invention, there is first provided a card for recording the number of game play media, on which at least the number of game play media paid out to a player from a game machine is recorded and which is issued to the player, the card comprising:

a substrate and a recording portion disposed on the substrate for writing data, the recording portion being a layer made of a substance whose physical properties reversibly change by heating for visibly recording data by local heating according to a heating pattern corresponding to an image of data to be recorded.

In the card, the recording portion can be made of an organic compound having properties such that a crystal aggregates upon application of heat at a first predetermined temperature and that the crystal diffuses upon application of heat at a predetermined temperature higher than the first temperature.

According to the invention, there is secondly provided a card for recording the number of game play media on which at least the number of game play mediums paid out to a player from a game machine is recorded and which is issued to the player, the card comprising:

a substrate and a recording portion disposed on the substrate for writing data, the recording portion being a portion where data is visibly recorded in ink and erased upon irradiation with light of a specific wavelength.

In the invention, the recording portion can be formed at an area where at least a plurality of digits can be easily read. The recording portion can further include a region for displaying a date. The recording portion can further include a region for recording a bar code.

The substrate can be made of a flexible material having a card-like form.

To the second end, according to the invention, there is thirdly provided a card dispensing device for recording at least the number of game play media paid out to a player from a game machine on a card on which data can be recorded and for issuing the card to the player, the card dispensing device comprising:

a case for housing a plurality of cards;

a section for discharging the cards to the outside of the card dispensing device;

a transporter which forms a card transport route from the case to the discharge section and which takes out the cards one at a time from the case for transporting along the transport route; and a recording section being disposed along the transport route for writing the number of game play media onto the transported card upon receipt of an external signal indicating the number of game play media.

The recording section can have a thermal head. The recording section can further include a thermosensible tape cassette having thermosensible tape to which ink transferred to the card by means of the thermal head is applied and a mechanism for running the tape in response to printing.

The case can have surrounding walls for housing a plurality of cards one over the other therewithin.

The transporter can have a transfer belt mechanism, a transfer guide, and transfer rollers.

The transfer belt mechanism can be disposed below the surrounding walls, so that a gap in which the cards can be discharged one at a time can be formed between the transport belt mechanism and the surrounding walls to place the card within the surrounding walls on a transport plane, and can have a configuration having an engagement part with the one card placed on the transport plane for moving the card on the transport plane in the gap direction by power.

The transport guide can have a card discharge section and a transport route for linking the card discharge section and the gap in the transport belt mechanism.

The transport rollers are adapted to be driven by power for transporting the card from the gap, through the transport route of the transport guide, to the card discharge section.

To the second end, according to the invention, there is thirdly provided, for a card on which is recorded data concerning game plays containing at least the number of game play media paid out to a player from a game machine, a card receiving device for reading the data and erasing it to make the card reusable, comprising:

a card housing section having an inlet for housing cards and being capable of housing a plurality of cards taken in through the housing inlet;

a transporter having a card insertion slit and a transport route for linking the card insertion slit and the housing inlet of the card housing section for transporting the cards along the transport route;

a card housing mechanism for housing the cards transported via the transport route in the card housing section through the housing inlet;

a data display section being disposed at a location where an external observer can view the displayed data;

a read section being disposed along the transport route for reading the number of game play media recorded on the transported card and displaying the data on the data display section; and an erasion section being disposed along the transport route for erasing data erasably recorded on the transported card.

The card for recording the number of game play media is made of a substrate formed with a substance where characters, etc., can be recorded and erased by heating. In the specification, such a substrate will be referred to as a card form. Such a card form can be produced by laminating an organic compound having properties such that a crystal aggregates upon application of heat at a predetermined temperature and that the crystal diffuses upon application of heat at another predetermined temperature on the surface of a flexible material such as card-like paper or plastic.

By applying heat at a predetermined temperature to such a card form, a crystal of the organic compound layer aggregates, causing light to be irregularly reflected, thereby representing characters, digits, etc. On the other hand, if heat is applied at a different predetermined temperature from that predetermined temperature, the crystal diffuses, causing the characters, digits, etc., to disappear. That is, the organic compound layer enables the characters, etc., to be erasably displayed by reversibly changing the properties.

The number of game play media is recorded on the card by applying heat at the predetermined temperature. Personnel in the game parlor can read the recorded number of game play media and dispense a prize to the player corresponding to the number of game play media.

If heat at the different predetermined temperature described above is applied to the card after payment has been made, the recorded number of game play media is erased. Therefore, if the card itself is not damaged, the number of game play media can be repeatedly recorded on the card by heating.

In another embodiment of the card for recording the number of game play media, the number of game play media is recorded in ink erased by irradiation with light of a predetermined wavelength. In this case, personnel in the game parlor can also read the recorded number of game play media and dispense a prize corresponding thereto to the player.

If the card is irradiated with light of the predetermined wavelength after payment has been made, the recorded number of game play media is erased. Therefore, if the card itself is not damaged, the number of game play media can be repeatedly recorded on the card in erasable ink.

When the number of game play media on the card is represented by at least either of digits or a code such as a bar code, the number of game play media can be known by visually checking the digits or reading the code.

Normally, a given amount of money is entered in a game play media lending device to lend a necessary number of game play media. At this time, the amount of money remaining after subtracting the amount of money paid to buy game play media from the amount of money entered in the game play media lending device can be recorded on the card of the invention, in which case the remaining amount of money can be checked easily.

At the card dispensing device, the cards housed in the case are taken out one at a time by the transporter for transporting along the transport route. When the recording section disposed along the transport route receives an external signal indicating the number of game play media, it applies heat at the predetermined temperature for writing the number of game play media onto the transported card. Data can also be written with ink erased by irradiation with light of the predetermined wavelength. The card dispensing device can handle a plurality of the cards together and facilitates writing the number of game play media.

When the case has surrounding walls and the transporter has a transport belt mechanism, transport guide, and transport rollers, the card for recording the number of game play media is engaged with the engagement part of the transport belt mechanism and placed on the transport plane, then discharged from the gap between the transport belt mechanism and surrounding walls by power. The transport rollers are driven by power in order to transport the card from the gap via the transport route of the transport guide to the card exit.

The card receiving device has the card housing section in which a plurality of the cards are housed. The card inserted into the card insertion slit is transported along the transport route to the card housing section by the transporter.

The read section disposed at an intermediate position of the transport route reads the number of game play media recorded on the transported card and displays it on the display section. On the other hand, the erasion section of the card receiving device applies heat at the different predetermined temperature described above to the card transported on the transport route for erasing the record of the number of game play media. The card where the record has been erased can be reused. If the number of game play media is recorded in erasable ink, the card is irradiated with light of the predetermined wavelength.

The cards transported along the transport route to the card housing section are housed in sequence by the card housing mechanism in the card housing section through the housing inlet. If a recording section is provided, when an external signal is received, the recording section applies heat at the predetermined temperature described above to the card transported on the transport route for writing the number of game play media. Thus, the card can be used repeatedly.

Since the record written onto the card according to the invention is erased, the card itself can be recycled for reducing receipt expenses as well as for conserving resources and reducing the amount of rubbish.

BRIEF DESCRIPTION OF THE DRAWINGS

In the accompanying drawings:

FIG. 3 is a schematic front view showing a card dispensing device according to the first embodiment of the invention;

FIG. 4 is a sectional view showing the internal structure of a card receiving device according to the first embodiment and a second embodiment of the invention;

FIGS. 5(A) and 5(B) are a front view showing a prize exchange card according to the second embodiment of the invention;

BEST MODE FOR CARRYING OUT THE INVENTION

Referring now to the accompanying drawings, there are shown preferred embodiments of the invention.

FIGS. 1 to 4 show a first embodiment of the invention. The first embodiment is an example in which a card for recording the number of game play media is used for prize exchange. In the following embodiments, the card for recording the number of game play media is referred to as a prize exchange card.

Figure 1:
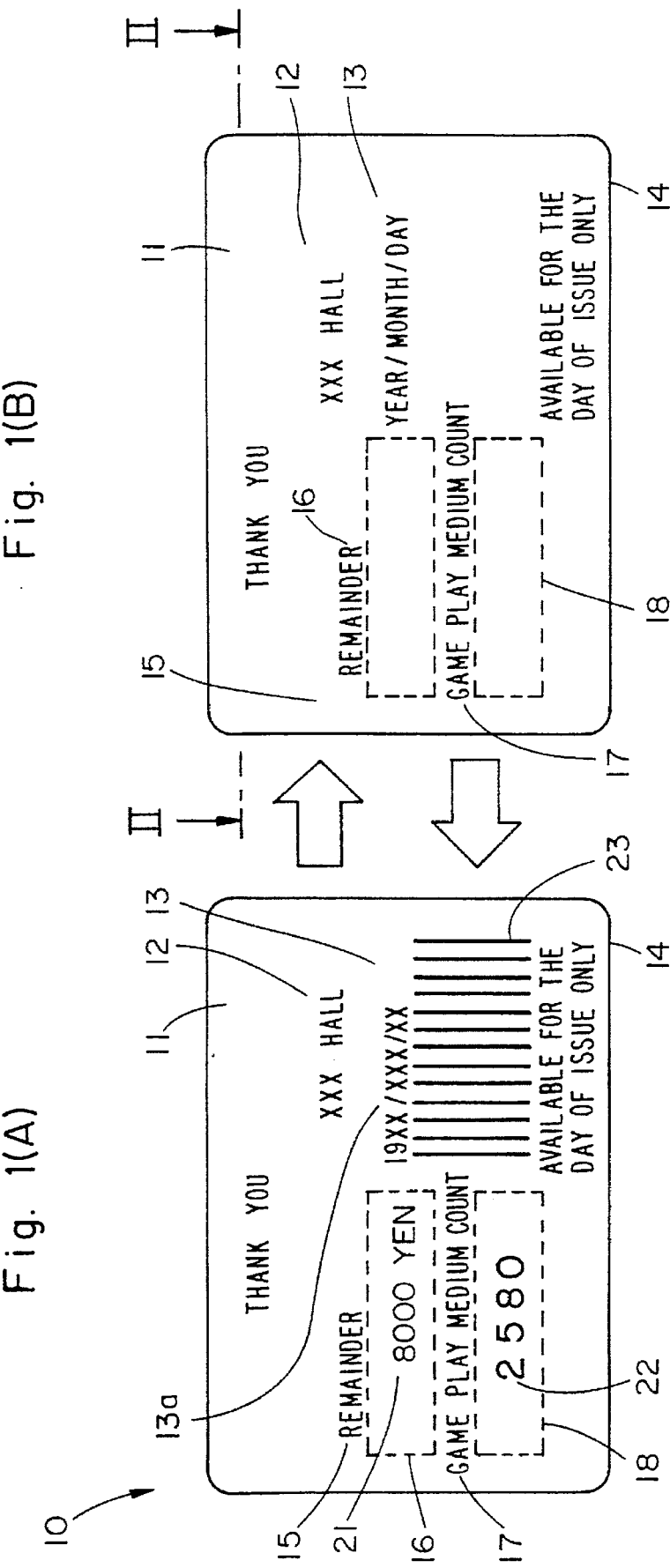
FIGS. 1(A) and 1(B) are a front view showing a prize exchange card according to a first embodiment of the invention.

As shown in FIG. 1, prize exchange card 10 is a thin card. The prize exchange card 10, which is used at a game parlor having game machines (not shown) such as pinball machines and slot machines, is a medium for recording the number of game play media such as metal balls and medals paid out to a player from the game machine.

Figure 2:
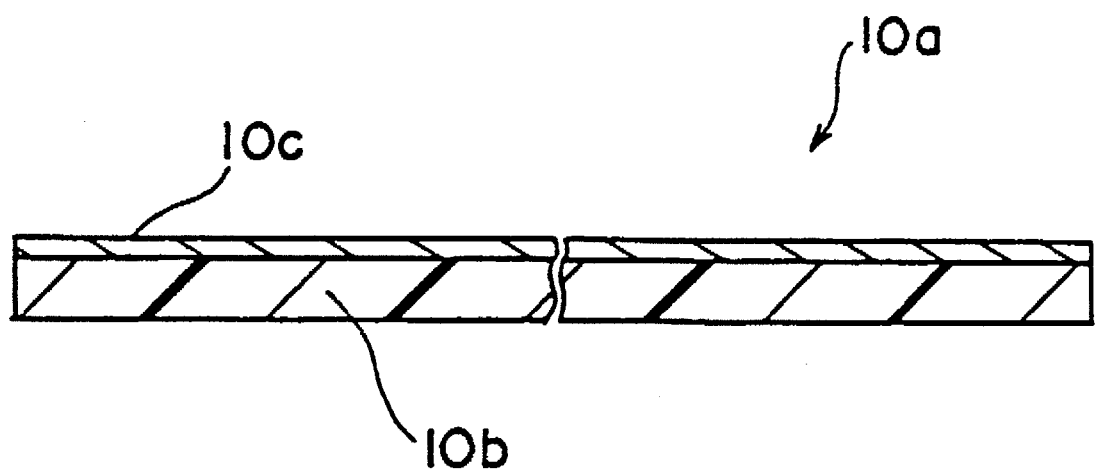
FIG. 2 is a front view showing a form of the prize exchange card according to the first embodiment of the invention.

As shown in FIG. 2, the prize exchange card 10 is made of a card form 10a on which characters, etc., can be recorded and erased by heating so that the card can be used repeatedly. The card form 10a is made up of card-like flexible material 10b and an organic compound layer 10c laminated on the surface of the flexible material 10b.

The card form 10a uses recently developed paper called "erasable reusable paper (ERP)" on which characters, etc., can be written and erased repeatedly by heating.

Material such as good quality thick paper or plastic is used as the card-like flexible material 10b. For example, PET (poly(ethylene terephthalate)) resin may be used.

The organic compound layer 10c is a thin film of an organic compound having such properties that a crystal aggregates if heat is applied at a predetermined temperature and that the crystal diffuses if heat is applied at another predetermined temperature. The temperature at which the crystal is aggregated may be higher or lower than that at which the crystal is diffused. A specific example of the organic compound comprises higher fatty acid of behenic acid, lauric acid, stearic acid dispersed into polymeric matrix material such as a vinylidene chloride. In addition, a small amount of a surface active agent or the like is added. The organic compound layer 10c may be further coated with a protective film on the surface thereof.

The organic compound layer 10c can be made of a substance which is transparent at room temperature, but when locally heated, the heated part is polycrystallized and becomes opaque. For example, it can comprise ultra-fine particles of organic molecules of stearic acid, etc., dispersed in vinyl chloride resin having high heat resistance. If heat is applied to the substance at 100° C. or higher, the dispersed organic molecule particles change to be polycrystalline and white opaque; an image, such as characters and graphics, can be displayed on the white opaque portion as a pattern. To erase the pattern, for example, it is heated at a lower temperature than the former heating temperature, for example, at 95° C. or less. Doing so restores the organic compound layer 10c to the transparent state.

By applying heat at a predetermined temperature to such a card form 10a, a part of the organic compound layer 10c is polycrystallized, causing light to be irregularly reflected, thereby representing characters, digits, etc. On the other hand, if heat is applied at a different temperature from the predetermined temperature, for example, at a temperature about 10° C. higher, the crystal diffuses, causing the characters, digits, etc., to disappear.

Printed on one side of the prize exchange card 10 in normal ink which is difficult to erase is the indication 11 "THANK YOU," indication 12 of the game parlor name where the card can be used, indication 13 of the use year, month, day the card is used, indication 13a of specific date of use of the card, indication 14 of expiration date drawn below the indication 13, indication 15 "REMAINDER," and indication 17 "GAME PLAY MEDIUM COUNT."

Indication 21 of the amount of money remaining after subtracting the amount of money paid to buy game play media from the amount of money input to a game play media lending device (in this case, 8000 yen) is written within a frame 16 by applying heat at a predetermined temperature for recording. Likewise, indication 22 of the number of game play media (in this case, 2580) is written within a frame 18 by applying heat at the predetermined temperature for recording. Recorded in the space between the indications 13 and 14 is a bar code indication 23 concerning the number of game play media, the remaining amount of money, date, hall code, and any other security type data.

Indications 13a, 21, 22, and 23 are recorded on the prize exchange card 10 by a card dispensing device 30 shown in FIG. 3.

As shown in FIG. 3, the card dispensing device 30 comprises a case 31, a transporter 32, and a recording section 33. The case 31 is a card holder consisting of surrounding walls 31d to accommodate a plurality of prize exchange cards 10 one over the other therewithin.

One end of a lever 31a is pivotally secured to the top end of the case 31, and a weight 31c is secured via a short lever 31b to the other end of the lever 31a. The card dispensing device 30 is adapted to supply prize exchange cards 10 to the side of a transport plane 41a by pressure of the weight 31c.

The transporter 32 is adapted to take out prize exchange cards 10 one at a time from the case 31 and feed them along a transport route 32a. The transporter 32 comprises a transport belt mechanism 41, a transport guide 42, and transport rollers 43.

The transport belt mechanism 41 is disposed below the surrounding walls 31d so that a gap in which prize exchange cards 10 can be discharged one at a time can be formed between the transport belt mechanism 41 and the surrounding walls 31d of the case 31 to place the prize exchange card 10 within the surrounding walls 31d on the transport plane 41a.

More particularly, the transport belt mechanism 41 has an endless belt 41d placed on a driving pulley 41b and a driven pulley 41c for moving the prize exchange card 10 on the transport plane 41a in the gap direction by power. The endless belt 41d has engagement parts 41e, 41e with one prize exchange card 10 placed on the transport plane 41a.

The transport guide 42 has a card exit 42a from which cards are discharged and a transport route 32a for linking the card exit 42a and the gap in the transport belt mechanism 41. The transport rollers 43 comprise a pinch roller 43a and a card drive roller 43b, between which the transport route 32a is sandwiched from above and below, downstream of the recording section 33. The transport rollers 43 are adapted to be driven by power for transporting prize exchange cards 10 from the gap through the transport route 32a of the transport guide 42 to the card exit 42a.

The recording section 33, which is disposed along the transport route 32a, is adapted to apply heat at a predetermined temperature to prize exchange cards 10 transported one at a time upon receipt of an external signal for printing the number of game play media on the cards.

More particularly, the recording section 33 contains a thermal head 34 for writing characters, etc., and heating means (not shown) for heating the thermal head 34 to a predetermined temperature.

Indications 13a, 21, 22, and 23 on the prize exchange cards 10, after each use, are erased by a card receiving device 50 shown in FIG. 4.

As shown in FIG. 4, the card receiving device 50 comprises data display sections 50a, a display operation panel 50b, a card housing section 51, a card housing mechanism 52, a transporter 53, a read section 54, an erasion section 55, and a recording section 56.

The card housing section 51 can house a plurality of prize exchange cards 10 and has an inlet 51a for housing the prize exchange cards 10. Housed in the card housing section 51 are prize exchange cards 10 from which indication of the remaining amount of money, 21, indication of the number of game play media, 22, bar code indication 23, and date indication 13a are erased.

When a card brought by a player is inserted into a card insertion slit 53a, it is subjected to treatment for erasion of indications. The card housing mechanism 52 is a mechanism for introducing the card into a card standby section 51b from the housing inlet 51a for housing the card in the card housing section 51.

The transporter 53 has a transport route 53b for linking the card insertion slit 53a and the housing inlet 51a of the card housing section 51 and has a card feeder 71 at the first step, a card feeder 72 at the second step, and a card feeder 73 at the third step.

Each of the card feeders 71–73 consists of an endless belt 71c placed on pulleys 71a and 71b at both ends and pinch rollers 71d and 71e opposed to the pulleys 71a and 71b. The transporter 53 is adapted to transport prize exchange cards 10 along the transport route 53b by the card feeders 71–73.

The read section 54, which is disposed at the position of the card feeder 71 at the first step along the transport route 53b of the transporter 53, consists of a bar code reader for reading the bar code indication 23 such as the number of game play media recorded on the transported prize exchange cards 10 and causing signals such as the number of game play media to be displayed on the data display sections 50a, 50a.

The erasion section 55, which is disposed at the position of the card feeder 72 at the second step along the transport route 53b of the transport guide 42, consists of an erasion heat source for applying heat higher than the heat at the predetermined temperature to the transported prize exchange cards 10 for erasing the record of the indication of the number of game play media.

The recording section 56 consists of the above-mentioned thermal head 34, etc., and is disposed at the position of the card feeder 73 at the third step along the transport route 53b of the transporter 53. When a remainder occurs in the number of game play media after a prize is dispensed, the remainder should be rewritten on return thereof. Then, the recording section 56 is adapted to apply heat at a predetermined temperature for writing the remainder of the number of game play media onto the prize exchange card 10.

Next, the operation of the card dispensing device 30 and the card receiving device 50 for issuing and collecting a prize exchange card 10 will be described.

In FIG. 3, the card dispensing device 30 has the case 31 in which a plurality of prize exchange cards 10 are housed. The card dispensing device 30 engages one prize exchange card 10 in the case 31 with the engagement part 41e of the transport belt mechanism 41 and places the card 10 on the transport plane 41a for discharging it from the gap between the transport belt mechanism 41 and the surrounding wall 31d of the case 31 by power. The prize exchange card 10 pushed onto the transport guide 42 is sandwiched between the transport rollers 43.

The transport rollers 43 are driven by power for delivering the prize exchange card 10 sandwiched therebetween at a given distance and isolating it from the transport belt mechanism 41 for standby.

When a player presses a pay switch to exchange game play media, such as metal balls or medals paid out from a game machine, for a prize, the recording section 33 disposed along the transport route 32a receives signals such as the remaining amount of money, the number of game play media, year, month, day, and bar code from an external counter and writes the number of game play media, etc., onto a transported prize exchange card 10 by heating.

That is, dot elements of the thermal head 34 of the recording section 33 are driven by the heating means (not shown) and heated to a predetermined temperature and the heat at the predetermined temperature is applied to the organic compound layer 10c of the prize exchange card 10 for writing digits and characters representing the number of game play media on the surface of the prize exchange card 10. In this case, by applying the heat at the predetermined temperature to the organic compound layer 10c, a crystal of the organic compound layer 10c aggregates, causing light to be irregularly reflected, thereby representing visual characters, digits, etc.

Since the digits and characters are written by applying heat to the organic compound layer 10c on the card, expendable items such as ink ribbons become unnecessary thereby reducing the costs. Since labor for changing ink ribbons, etc., is obviated, the card system becomes convenient to handle.

At the write operation, the thermal head 34 approaches a card so that the dot elements close in on the organic compound layer 10c. Upon completion of the write operation, the thermal head 34 is separated from the card by floating, etc. The prize exchange card 10 is sandwiched between the pinch roller 43a and the card drive roller 43b and is discharged from the card exit 42a.

At this stage, the endless belt 41d of the transport belt mechanism 41 is driven to feed another prize exchange card 10 to the write set position.

Date indication 13a, indication of the remaining amount of money, 21, indication of the number of game play media, 22, and bar code indication 23 are written on each prize exchange card 10 dispensed from the card dispensing device 30, as shown in FIG. 1.

Since the number of game play media is represented by digits on indication 22, the player can visually check the digits to know the number of game play media, namely, check the number of acquired game play media, etc., at a glance and take the prize exchange card 10 to a prize exchange counter or window without anxiety.

At the prize exchange counter or window, personnel to exchange the card for a prize can read the recorded number of game play media and pay out the remaining amount of money or a prize corresponding to the number of game play media.

At the prize exchange counter or window, the prize exchange card 10 is entered in the card receiving device 50 and the bar code indication 23 is read, thereby displaying the remaining amount of money, the number of game play media, and the year, month, day of issuing the card.

Then, the remaining amount of money or a prize corresponding to the number of game play media is paid out to the player, in which case the manual or automatic mode can be selected. To use the automatic mode, an automatic dispenser is required.

Since the remaining amount of money (the amount of money input to the game play media lending device minus the amount of money paid to buy game play media) is recorded as the indication of the remaining amount of money, 21, the remaining amount of money can be checked easily.

When heat at the different predetermined temperature described above (heat at a temperature about 10° C. higher than the predetermined temperature described above) is applied to the prize exchange card 10 after payment has been made, the crystal of the organic compound layer 10c diffuses, causing the characters, digits, etc., to disappear. Therefore, if the prize exchange card 10 itself is not damaged, the number of game play media, etc., can be recorded repeatedly on the card by heating.

As shown in FIG. 4, the card receiving device 50 has the card housing section 51 in which a plurality of used prize exchange cards 10 from which data has been erased are housed. The transporter 53 transports the prize exchange cards 10 along the transport route 53b.

The read section 54 reads the bar code 23 recorded on a prize exchange card 10 inserted through the card insertion slit 53a and displays the data on the data display sections 50a, 50a. A prize exchange card 10 which is detected as problematic at the read section 54 can be returned to the card insertion slit 53a for inspection by driving the card feeder 71 at the first step in the reverse direction.

The erasion section 55 applies heat at a temperature about 10° C. higher than the predetermined temperature described above to the prize exchange card 10 from which the data has been read for erasing the predetermined records of date indication 13a, indication of the remaining amount of money, 21, indication of the number of game play media, 22, and bar code indication 23. The prize exchange card 10 from which the records have been erased is fed by the card feeder 73 and stands by at the position of the recording section 56.

When a remainder occurs on the number of game play media after the card is exchanged for a prize, the recording section 56 can apply heat at a predetermined temperature to the card for writing the remaining number of game play media after the exchange. The prize exchange card 10 on which the remaining number of game play media is recorded is again returned to the card insertion slit 53a.

At this time, if the write operation is not performed and another prize exchange card 10 is inserted through the card insertion slit 53a, the prize exchange card 10 which is standing by is introduced to the housing inlet 51a and is housed in the card housing section 51 by the card housing mechanism 52.

The prize exchange cards 10 in the card housing section 51 can be taken out for repetitive use as recycled cards.

On the prize exchange card according to the first embodiment, a bar code is used as code representing the number of game play media, but the code is not limited to the bar code and may be another code that can be read.

Personnel in the game parlor may collect the used prize exchange card 10 and use the erasion section 55 to erase indication of the remaining amount of money, 21, indication of the number of game play media, 22, date indication 13a, etc., from the prize exchange card 10.

The prize exchange card 10 may be formed with a magnetic recording member on which data is also magnetically recorded.

The card dispensing device 30 may be provided with an alarm device for sending an alarm signal to a hall management computer or turning on a lamp on a counter of the number of game play media to alert personnel in the game parlor if the number of prize exchange cards 10 in the case 31 falls below a given number.

Next, a second embodiment of the invention will be described.

Figure 6:
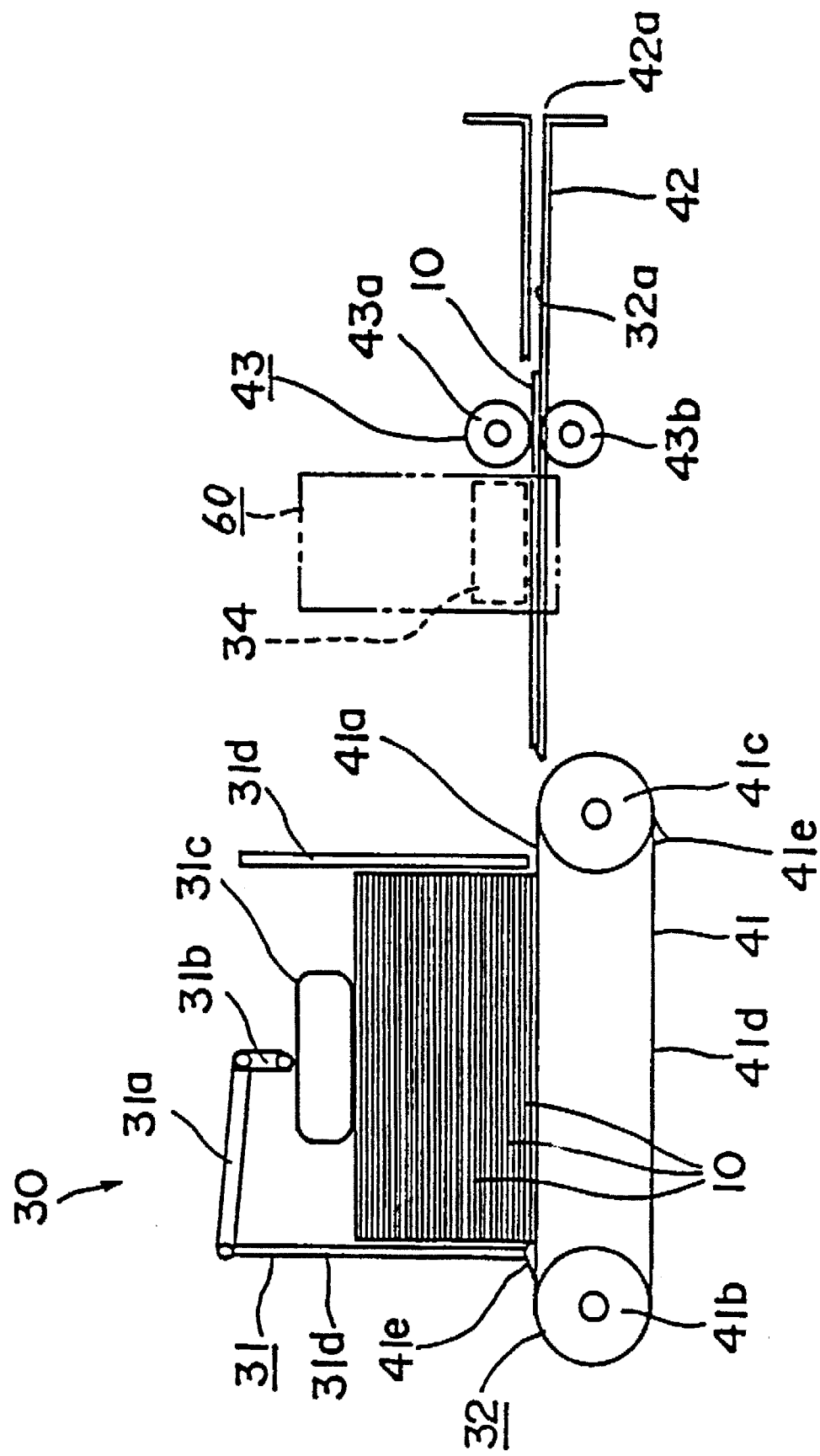
FIG. 6 is a schematic front view showing a card dispensing device according to the second embodiment of the invention.
Figure 7:
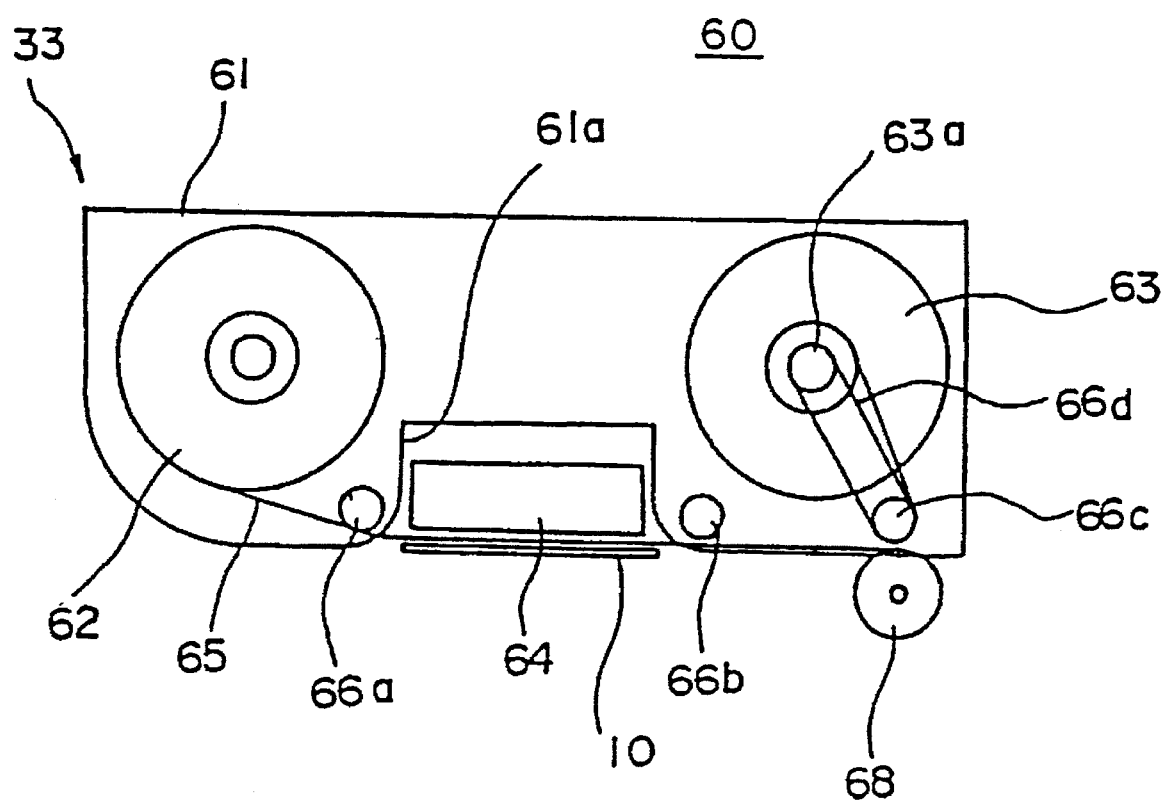
FIG. 7 is a plan view showing an example of the structure of a thermosensible tape cassette used in the second embodiment of the invention.

FIGS. 5 to 7 show the second embodiment of the invention.

As shown in FIG. 5, the prize exchange card 10 is a thin card having a rectangular shape. The prize exchange card 10, which is used at a game parlor having game machines (not shown) such as pinball machines and slot machines, is a medium for recording the number of game play media of the pinball and slot machines, etc., paid out to a player from the game machine. The prize exchange card 10 is made of material such as high quality paper or plastic so that the card can be used repeatedly.

Printed on one side of the prize exchange card 10 in normal ink which is difficult to erase are indication 11 "THANK YOU," indication 12 of the game parlor name where the card can be used, indication 13 of the year, month, day of use of the card, indication 14 of expiration date drawn below the indication 13, indication 15 "REMAINDER," and indication 17 "GAME PLAY MEDIUM COUNT."

Indication 21 of the amount of money remaining after subtracting the amount of money paid to buy game play media from the amount of money input to a game play media lending device is recorded in digits within a display area of the remaining amount of money, 16, in ink erasable by irradiation with light of a predetermined wavelength. The ink is not affected by light of wavelengths between 400–700 nanometers (visible rays), but disappears in a short time if light of 820 nanometers is applied to the ink with a halogen lamp or the like. Indication 22 of the number of game play media is recorded in digits in the same ink within a display area of the number of game play media, 18. Recorded in the space between the indications 13 and 14 is bar code indication 23 concerning the date, the remaining number of money, the number of game play media, and security type data.

Indications 21, 22, 23, and 13a are recorded on the prize exchange card 10 by a card dispensing device 30 shown in FIG. 2.

An example of the card dispensing device 30 appropriate for dispensing the card according to the embodiment has a structure as shown in FIG. 6. The device has the same structure as the device shown in FIG. 3 except for a recording section 60. Here, description will be given centering around the differences between them.

The recording section 60, which is disposed along a transport route 32a, is adapted to print the number of game play media on the transported prize exchange card 10 in ink erased by irradiation of light of a predetermined wavelength upon reception of external signals indicating the date, the remaining amount of money, the number of game play media, etc. FIG. 3 shows the structure of the recording section 60.

The recording section 60 has a thermosensible tape cassette 61, which contains thermosensible tape 65 and a mechanism for running the thermosensible tape 65 in response to the progress of printing. The running mechanism has a feed reel 62 and a winding reel 63, which are housed rotatably. A recess 61a is formed at the side center of the thermosensible tape cassette 61, and a thermal head 64 can be located in the recess 61a.

The thermosensible tape 65 is guided by means of rollers 66a, 66b, 66c, etc., and wound through the thermal head 64 around the feed reel 62 and the winding reel 63. A drive roller 68 mounted on a drive shaft of a motor 67 is in contact with the roller 66c through an opening formed in the thermosensible tape cassette 61. A reel drive belt 66d is placed on the roller 66c and a rotation shaft 63a of the winding reel 63 so that the winding reel 63 rotates by rotation of the drive roller 68. The rotation shaft 63a of the winding reel 63 may be directly rotated.

The operation of the recording section 60 according to the second embodiment of the invention is described. When a player enters game play media such as metal balls or medals paid out from a game machine into a game play media counter (not shown) and after completion of counting the number of game play media, presses a pay switch, the recording section 60 disposed along the transport route 32a receives data, year, month, day signal, etc., from external counter, and uses the thermosensible tape 65 of the thermosensible tape cassette 61 to print data on a transported prize exchange card 10. For the thermosensible tape 65, dot elements of the thermal head 64 are heated and data is printed on the prize exchange card 10 by thermal welding of ink which can be erased by irradiation of light of a predetermined wavelength.

Next, an example of a card receiving device corresponding to the card in the embodiment will be described.

The card receiving device 50 used in the embodiment can have the same structure as the card receiving device shown in FIG. 4 except for an erasion section and a recording section. Therefore, here, only the differences between them will be described again with reference to FIG. 4. Numeral 70 enclosed in parentheses in FIG. 4 denotes the erasion section in the second embodiment and numeral 80 enclosed in parentheses in the figure denotes the recording section in the embodiment. The erasion section 70 is made up of, for example, a light source for light having a wavelength of 820 nanometers and a light source drive (not shown). For example, a halogen lamp is used as the light source. The light source is disposed at the position of a card feeder 72 at the second step along a transport route 53b for irradiating a transported prize exchange card 10 with light of a predetermined wavelength (820 nanometers) for erasing predetermined ink.

The recording section 80 consists of the thermosensible tape cassette 61 shown in FIG. 7 described above. That is, the recording section 80 is disposed at the position of a card feeder 73 at the third step along the transport route 53b. To return remaining game play media to the player with a card, the recording section 80 prints the remaining number of game play media on the prize exchange card 10 as digits and bar code in predetermined ink.

Next, the operation of the erasion section 70 and the recording section 80 according to the embodiment will be described.

The erasion section 70 irradiates the prize exchange card 10, after payment has been made, with light of a predetermined wavelength. That is, after the above-mentioned read and display, etc., are performed by the read section 54, the erasion section 70 irradiates the prize exchange card 10 with light of the predetermined wavelength (820 nanometers) for erasing the predetermined ink in which 13a, indication of the remaining amount of money, 21, data indication 22, date indication 13a, and bar code indication 23 are written, thereby causing the recorded data to disappear. Therefore, if the prize exchange card 10 itself is not damaged, data can be repeatedly recorded in the erasable ink.

If remaining game play media need to be returned, the recording section 80 prints the remaining number of game play media on prize exchange card 10, which is on stand by, in the predetermined ink. The prize exchange card 10 on which the remaining number of game play media is recorded is again returned to card insertion slit 53a. Prize exchange cards 10 onto which new information is not rewritten are housed in a card housing section 51 by a card housing mechanism 52. The prize exchange card 10 in the card housing section 51 can be taken out for repetitive use as recycled cards.

Although the heat transfer ink ribbon of the thermosensible tape cassette 61 is used to print data on the prize exchange card 10 in the erasable ink in the second embodiment, toner type ink used with copiers and ink ribbons for dot printers may be used in addition to the thermosensible tape cassette.

Personnel in the game parlor may collect the used prize exchange card 10 and use the light source 55 to erase indication of the remaining amount of money, 21, data indication 22, date indication 13a, and bar code indication 23 on the prize exchange card 10.

The prize exchange card 10 may be formed of a magnetic recording member on which data is also magnetically recorded.

The card dispensing device 30 may be provided with an alarm device for sending an alarm signal to a hall management computer or turning on a lamp on a counter of the number of game play media to alert personnel in the game parlor if the number of prize exchange cards 10 in the case 31 falls below a given number.

When the thermosensible tape 65 wound around the feed reel 62 of the thermosensible tape cassette 61 of the recording section 60 or 56 approaches the end of the tape, personnel in the game parlor may be alerted so that they can change the recording section 60.

We claim:

1. A gaming system comprising:
   a card dispensing device for recording the number of game play media paid out to a player from a game machine for winning plays on a card and issuing the card to the player, said card dispensing device comprising:
   a case for housing a plurality of cards, each one of said plurality of cards comprising a substrate and a substance, whose physical properties reversibly change by heating, disposed like a layer on said substrate for visibly recording data by local heating according to a heating pattern corresponding to an image of data to be recorded, said substance being made of any organic compound having properties that a crystal aggregates upon application of heat at a second temperature different from the first temperature, a section for discharging the cards to the outside of said card dispensing device;

a transporter which forms a card transport route from said case to said discharge section and takes out said cards one at a time from said case for transporting along the transport route; and a recording section for recording a bar code in a first region of the transported card and for recording the number of game play media in at least a second region of the transported card, said second region being formed in an area where at least a plurality of digits can be easily read; and a card receiving device for reading the data recorded by said recording section of said card dispensing device and erasing the data to make the card reusable comprising:

a card housing section having an inlet for housing cards and being capable of housing a plurality of cards taken in through the housing inlet;

a transporter having a card insertion slit and a transport route for linking the card insertion slit and the housing inlet of said card housing section for transporting the cards along said transport route;

a card housing mechanism for housing the cards transported via said transport route in said card housing section through said housing inlet;

a data display section being disposed at a location where an external observer can view said section for displaying data;

a bar code reader, disposed along said transport route, for reading the bar code recorded on the transported card and displaying the coded information represented by the bar code on said data display section; and an erasion section, disposed along said transport route, for erasing data erasably recorded on the transported card by applying heat at said second temperature to said recording region of said card transported.

2. The system as claimed in claim 1, wherein the second temperature is higher than the first temperature for said substance.

3. The system as claimed in claim 2, wherein said recording portion further includes a region for displaying a date.

4. The system as claimed in claim 3, wherein said recording portion further includes a region for an amount of money.

5. The system as claimed in claim 4, wherein said bar code recorded by said recording section of said card dispensing device includes coded information indicating said amount of money.

6. The system as claimed in claim 3, wherein said bar code recorded by said recording section of said card dispensing device includes coded information indicating said date.

7. The system as claimed in claim 1, wherein said bar code recorded by said recording section of said card dispensing device includes at least security related coded information and coded information of said number of game play media.

8. The system as claimed in claim 7, wherein the second temperature is higher than the first temperature for said substance.

9. The system as claimed in claim 8, wherein said recording section of said card dispensing device records a date in a third region of the transported card.

10. The system as claimed in claim 9, wherein said bar code recorded by said recording section of said card dispensing device further includes coded information indicating said date.

11. The system as claimed in claim 10, wherein said recording section of said card dispensing records an amount of money in a fourth region of the transported card.

12. The system as claimed in claim 11, wherein said bar code recorded by said recording section of the card dispensing device further includes coded information indicating said amount of money.

13. A card dispensing device for printing at least the number of game play media paid out to a player from a game machine on a card and issuing the card to the player, said card dispensing device comprising:

a case for housing a plurality of cards;

a section for discharging the cards to the outside of said card dispensing device;

a transporter which forms a card transport route from said case to said discharge section and takes out said cards one at a time from said case for transporting along the transport route; and a bar code printer being disposed along said transport route and printing a bar code onto the transported card upon reception of an external signal indicating the number of game play media, said card comprising a substrate and a recording region disposed on said substrate for recording data, said recording region comprising a substance, whose physical properties reversibly change by heating, disposed like a layer on said substrate for visibly recording data by local heating according to a heating pattern corresponding to an image of data to be recorded, said substance being made of an organic compound having properties such that a crystal aggregates upon application of heat at a first temperature and that the crystal diffuses upon application of heat at a second temperature different from the first temperature, said bar code printer applying heat at said first temperature to said recording region of said transported card.

14. The card dispensing device as claimed in claim 13, wherein said bar code printer comprises a thermal head for at least heating said recording region at said first temperature.

15. The card dispensing device as claimed in claim 14, wherein said first temperature is lower than said second temperature.

16. The card dispensing device as claimed in claim 13, wherein said case has surrounding walls for housing a plurality of cards one over the other therewithin and wherein said transporter has a transfer belt mechanism, a transfer guide, and transfer rollers, said transfer belt mechanism being disposed below said surrounding walls to that a gap in which said cards can be discharged one at a time can be formed between said transport belt mechanism and said surrounding walls to place said card within said surrounding walls on a transport plane and having a configuration having an engagement part with said one card placed on said transport plane for moving said card on said transport plane in a direction of the gap by power, said transport guide having a card discharge section and a transport route for linking the card discharge section and the gap in said transport belt mechanism, said transport rollers being adapted to be driven by power for transporting said card from the gap through said transport route of said transport guide to said card discharge section.

17. For a card on which is recorded a bar code containing at least the number of game play media paid out to a player from a game machine, a card receiving device for reading the bar code and erasing it to make the card reusable, comprising:

a card housing section having an inlet for housing cards and being capable of housing a plurality of cards taken in through the housing inlet;

a transporter having a card insertion slit and a transport route for linking the card insertion slit and the housing inlet of said card housing section for transporting the cards along said transport route;

a card housing mechanism for housing the cards transported via said transport route in said card housing section through said housing inlet;

a data display section being disposed at a location where an external observer can view said section for displaying data;

a bar code reader being disposed along said transport route and reading the bar code containing at least the number of game play media recorded on the transported card and displaying the number of game play media as data on said data display section; and an erasion section being disposed along said transport route for erasing the bar code erasably recorded on the transported card, said card comprising a substrate and a recording region disposed on said substrate for recording data, said recording region comprising a substance, whose physical properties reversibly change by heating, disposed like a layer on said substrate for visibly recording data by local heating according to a heating pattern corresponding to an image of data to be recorded, said substrate being made of an organic compound having properties such that a crystal aggregates upon application of heat at a first temperature and that the crystal diffuses upon application of heat at a second temperature different from the first temperature, said erasion section for applying heat at said second temperature to said recording region of said card transported.

18. The card receiving device as claimed in claim 17, wherein said second temperature is higher than said first temperature.

* * * * *